United States Patent Office 3,349,117
Patented Oct. 24, 1967

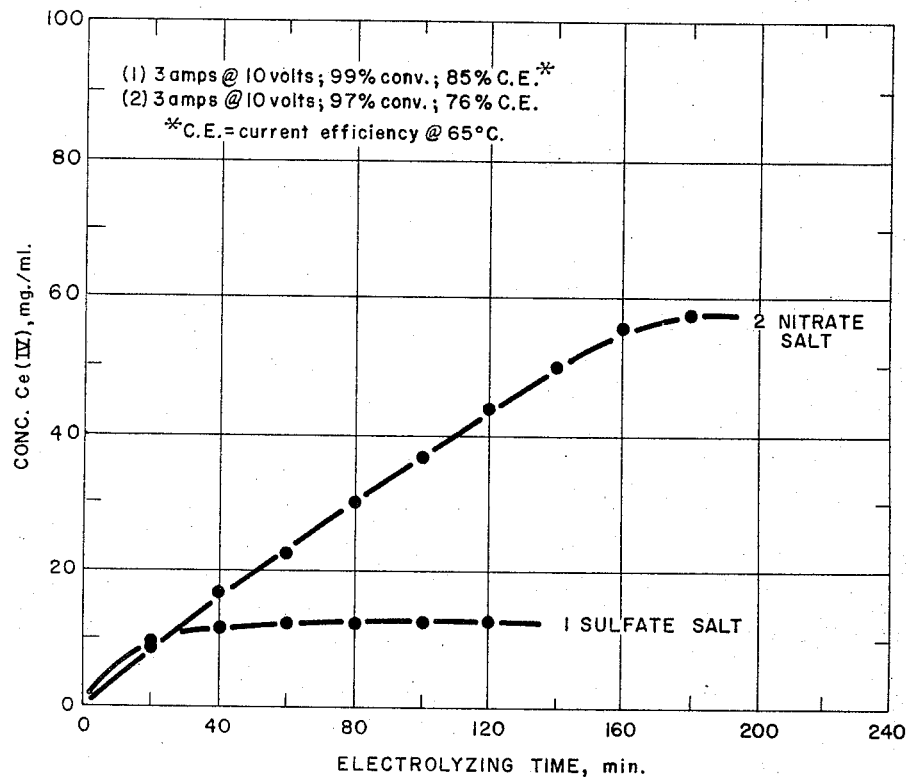

3,349,117
CONDENSATION AND OXIDATION OF ALKYL-AROMATIC COMPOUNDS WITH TETRAVALENT CERIUM COMPOUNDS AS PROMOTERS
Charles M. Selwitz, Pitcairn, and Edmond R. Tucci, Ross Township, Allegheny County, Pa., assignors to Gulf Research & Development Company
Filed July 15, 1965, Ser. No. 472,119
19 Claims. (Cl. 260—488)

This invention relates to a process with improved selectivity for the condensation and oxidation of alkylaromatics which contain at least one alpha-hydrogen atom and no olefinic unsaturation on the carbon atom of an alkyl group directly connected to the aromatic ring.

In accordance with the invention, an alkylaromatic, which contains at least one alpha-hydrogen atom and wherein the alpha carbon is saturated, is selectively condensed by a process which comprises contacting at least one of said alkylaromatics in the substantial absence of a gas containing free molecular oxygen and any oxygen-containing compounds selected from the group consisting of organic oxygen-containing compounds and water at a temperature between 60° C. and 300° C. with a promoter comprising an anhydrous cerium salt wherein cerium has a valence of plus four and wherein said cerium salt has a water solubility at 25° C. of at least 0.05 gram per 100 grams of water.

In one embodiment of this invention, an alkylaromatic, which contains only one alpha-hydrogen atom and wherein the alpha-carbon atom is saturated, is selectively condensed by a process which comprises contacting at least one of said alkylaromatics in the substantial absence of any oxygen-containing compounds selected from the group consisting of organic oxygen-containing compounds and water at a temperature between 60° C. and 300° C. with a promoter comprising an anhydrous cerium salt wherein cerium has a valence of plus four and wherein said cerium salt has a water solubility at 25° C. of at least 0.05 gram per 100 grams of water.

It has also been found that the addition of a gas containing free molecular oxygen to the processes wherein the alkylaromatic contains at least two alpha-hydrogen atoms on the same carbon atom directly connected to the aromatic ring, results in the production of the desired condensation products, but, in addition, results in the production of oxygenated alkylaromatics including aldehydes, ketones, alcohols and organic acids.

In addition, it has been found that reacting an alkylaromatic, which contains at least two alpha-hydrogen atoms on the same carbon atom directly connected to the aromatic ring, in the absence of oxygen-containing compounds selected from the group consisting of organic oxygen-containing compounds and water, and in the conjoint presence of (1) a tetravalent anhydrous cerium salt selected from the group consisting of ceric sulfate and ceric nitrate, and (2) selected inorganic nitrates, results in the production of oxygenated alkylaromatics in addition to the condensation products even in the absence of a gas containing free molecular oxygen.

The charge stock for the process of this invention can be any alkylaromatic having at least one alpha-hydrogen atom and wherein the alpha carbon is saturated. By an alpha-hydrogen atom is meant a hydrogen attached to an alpha-carbon atom. By an alpha-carbon atom is meant a carbon atom directly connected to the aromatic ring and which is a part of an alkyl group. This alpha-hydrogen atom can be designated an "active" hydrogen atom since it is more easily extractable by the cerium than other hydrogen atoms. Any alkyl group which contains at least one active hydrogen is defined as a "reactive alkyl group" for the purpose of this invention. The preferred alkylaromatics are those having at least one alpha-hydrogen atom and wherein the alkyl groups are saturated. The alkylaromatic can have one or more rings, condensed or uncondensed, and one or more alkyl groups. The preferred alkylaromatics have between 1 and 4 rings and between 1 and 4 alkyl group substituents. The alkyl groups can have between 1 and 10 carbon atoms. The alkylaromatics can have between 7 and 50 carbon atoms, preferably between 7 and 18 carbon atoms. The alkylaromatics can be substituted on the aromatic ring with substituents selected from the group consisting of halogen, —$NO_2$ and $C \equiv N$. The alpha-carbon atom should be saturated, that is, contain no olefinic double bond between the alpha and beta-carbon atoms of the alkyl group if there is a beta-carbon atom, since these alkylaromatics, as exemplified by styrene and substituted styrenes, are thermally polymerizable under the conditions of this invention, and are therefore less desirable charge stocks. If the alkylaromatic contains only one alpha-hydrogen atom, it can form a dimer but is not a suitable charge stock for the preparation of oxygenated alkylaromatics.

The most preferred alkylaromatics are the (1) monoalkylaromatics represented by the general formula:

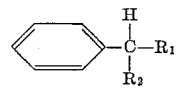

where $R_1$ and $R_2$ can be the same or different and are selected from the group consisting of hydrogen and hydrocarbon radicals having between one and 10 carbon atoms; and (2) the dialkyl aromatics represented by the general formula:

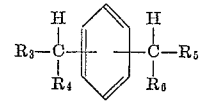

where $R_3$, $R_4$, $R_5$ and $R_6$ can be the same or different and are selected from the group consisting of hydrogen and hydrocarbon radicals having between 1 and 10 carbon atoms.

Examples of suitable charge stocks include toluene; o-, m- and p-xylene; ethylbenzene; propylbenzene; 1,2,3-trimethylbenzene; isopropylbenzene; 1 - methyl - 3-chlorobenzene; 1 - methyl - 4 - propylbenzene; 1 - methyl-3-nitrobenzene; 1 - methyl - 4 - cyanobenzene; 2 - phenyl-4 - methylpentane; 1 - phenylhexane; octylbenzene; 2-phenyldecane; pentadecylbenzene; 2 - phenyl - 3 - methylpentadecane; octadecylbenzene; 9 - (2 - phenylethyl)-heptadecane; 3 - phenyl - 1 - propene; 6-phenyl-1-hexene; phenylcyclobutane; 1 - methylnaphthalene; tetralin; fluorene; and diphenylmethane. The most preferred charge stocks are toluene and the xylenes. Unsuitable charge stocks include, for example, 2 - phenyl - 2 - methylpropane; 3-ethyl-3-phenylhexane; and styrene.

The condensation reactions of the process of this invention are promoted at a temperature between 60° C. and 300° C. with an anhydrous tetravalent cerium salt which has a water solubility at 25° C. of at least 0.05 gram per 100 grams of water. Examples of anhydrous tetravalent cerium salts useful in the process of this invention include the so-called single salts, such as ceric sulfate and ceric nitrate, and the so-called double salts, such as ceric ammonium sulfate and ceric ammonium nitrate. The ceric sulfate and ceric ammonium sulfate have solubility in water at 25° C. of at least 2 grams per 100 grams of water. The ceric nitrate and ceric ammonium nitrate are very soluble in water at 25° C. Ceric oxide is undesirable in that it is substantially inactive under the temperature conditions of the process of this invention. Ceric oxide is substantially insoluble in water at 25° C. In accordance with the above, the tetravalent cerium salts to be useful in promoting the subject reaction must have a solubility in water of at least 0.05 gram per 100 grams of water at 25° C.

In the case of the defined monoalkylaromatics, such as toluene, dimers are obtained when the alkylaromatic is contacted with the above defined tetravalent cerium salts at the defined temperatures. If a polyalkylated aromatic, such as p-xylene, etc. is employed as the charge stock, then some dimers may be obtained, but in addition, some polymers may be obtained since each of the alkyl groups, wherein the carbon atom directly connected to the aromatic ring contains at least one alpha-hydrogen atom, is capable of reacting and condensing.

In addition, it has been found that the selectivity to the production of condensation products, such as dimers is effected by the type of tetravalent cerium salt employed and by the presence of free molecular oxygen or oxygen-containing compounds, such as organic oxygen-containing compounds and water. Oxygenated organic compounds, such as aldehydes, ketones, acids, ethers, etc. and water are undesirable as extraneously added materials since the oxygen from these compounds can react with the cerium and thus use up the promoter.

The preferred anhydrous tetravalent cerium salts for the preparation of diaryl compounds are those selected from the group consisting of ceric sulfate, ceric ammonium sulfate and ceric ammonium nitrate. Ceric sulfate is the most preferred salt to promote the selective preparation of dimers.

It has been found that all of the anhydrous tetravalent cerium salts defined above, which have cerium combined with oxygen, are useful to promote the oxidation of the alkylaromatics which have at least two alpha-hydrogen atoms on the same carbon atom directly connected to the aromatic ring, even in the absence of free molecular oxygen. The primary product in the absence of free molecular oxygen is the dimer or polycondensation product, but some oxygenated materials are formed, such as aldehydes, ketones, alcohols and organic acids. If the alkylaromatic is such that it contains only one alpha-hydrogen atom, then oxidation products will not form.

If the reaction occurs in an atmosphere of a gas which contains free molecular oxygen, such as air, or if a gas containing free molecular oxygen is introduced into the reaction medium, the production of oxygenated alkylaromatics, such as aldehydes, ketones, alcohols and acids, is promoted, so long as the alkylaromatic has at least two alpha-hydrogen atoms as defined above.

It has additionally been found that the production of oxygenated products, such as esters, organic acids, aldehydes and ketones, is further aided when the promoter consists of (1) a tetravalent cerium salt selected from the group consisting of ceric sulfate and ceric nitrate, and (2) an inorganic nitrate. By an inorganic nitrate is meant a nitrate selected from the group consisting of alkali metal, alkaline earth metal and ammonium nitrates. By alkali metal and alkaline earth metals are meant lithium, sodium, potassium, rubidium, cesium, magnesium, calcium, strontium and barium. The preferred inorganic nitrates are the sodium, potassium and ammonium nitrates, with ammonium nitrate being the most preferred. The ceric nitrate and ammonium nitrate react to form the double salt ceric ammonium nitrate.

As noted above, ceric sulfate is the preferred ceric salt for the condensation of the defined alkylaromatics. If oxidation products are desired, the preferred salts are ceric nitrate, ceric ammonium nitrate and ceric sulfate in the presence of ammonium nitrate.

The reaction temperature should be at least 60° C. but below the decomposition temperature of the particular tetravalent cerium salt employed, which in most cases is below about 300° C. Reaction temperatures below 60° C. are not desirable in that the reaction rate is too slow. The reaction temperature can therefore vary between 60° C. and 300° C. with preferred reaction temperatures between 70° C. and 150° C.

The reaction pressure is not critical and any pressure can suitably be employed. Atmospheric pressure is preferred for economic reasons, but pressures as high as 1,000 p.s.i.g. or more can be used, if desired.

The contact time can vary between 30 minutes and 24 hours, or more, with contact times of 3 to 20 hours being preferred.

The tetravalent cerium salt functions in the manner of a reactant promoter. It requires the reduction of two ceric ions to cerous ions to produce one mole of diaryl compound from two moles of a reactive monoalkylaromatic, such as toluene. Another manner of stating this is that the tetravalent cerium salt is usually employed in an amount chemically equivalent to the active alpha-hydrogen atoms with which it reacts. It has been found that the ceric salt only reacts with one alpha-hydrogen per alkyl group even though the alkyl group may contain more than one alpha-hydrogen, which is the case for example, with toluene which has three hydrogens on the carbon atom directly connected to the aromatic ring. The equivalent ratio of ceric salt to reactive alkyl groups on the alkylaromatic is therefore the same as the equivalent ratio of ceric salt to active hydrogens.

The ceric ion during reaction is reduced to the inactive plus three cerous state and must be re-oxidized back to the active plus four ceric state before it can further serve as a promoter. When ceric sulfate is employed as the promoter in the absence of free molecular oxygen, condensation products, such as bibenzyl from toluene, are selectively produced and the molar ratio of ceric sulfate to a monoalkylaromatic is suitably about 1:1. Smaller amounts of the tetravalent cerium salt can be employed, but the conversion will be correspondingly reduced. Two moles of ceric salt are required to produce one mole of oxidized monoalkylaromatic, such as an aldehyde, ketone or acid. Correspondingly larger amounts of ceric salt are required for the reaction of more than one alkyl group on a polyalkylated aromatic. In general, the molar ratio of tetravalent cerium salt to reactive alkyl groups in the alkylaromatic will be between 0.1:1 and 10:1 in the absence of a gas which contains free molecular oxygen and is preferably between 0.5:1 and 2:1. When a gas which contains free molecular oxygen is employed, the molar ratio of the cerium salt to reactive alkyl groups in the alkylaromatic is between 0.1:1 and 10:1, and is preferably between 2:1 and 3:1.

The process of this invention is operated by simply contacting the tetravalent cerium salt with the defined alkylaromatic under the reaction conditions defined above. In general, the tetravalent cerium salts, such as ceric sulfate, ceric ammonium sulfate and ceric ammonium nitrate are substantially insoluble in the alkylaromatic charge stock and a heterogeneous reaction therefore occurs. It is therefore important to have adequate mixing to insure intimate contact between the ceric salt and the charge stock. It is, of course, preferred that the solid ceric salt be in a finely comminuted form to further aid in promoting the reaction.

Other inert liquids can be present in the reaction medium, such as paraffins, naphthenes, aromatics without side chains, or aromatics having no alpha-hydrogen atoms, but compounds containing reactive groups, such as oxygen which tend to react with the ceric ion are undesirable and should be excluded, unless, as indicated below, they serve some added function. Organic acid solvents should be avoided since the presence of an organic acid promotes the formation of esters.

As noted above, the plus four valence ceric ion is reduced to the plus three valence cerous ion during the reaction and must be re-oxidized before it is active for further reaction. The re-oxidation of the cerous to ceric ion can occur by any suitable method. One method is to re-oxidize the cerous ion after the reaction is over and the products separated. Re-oxidation can occur by electrolytic means, i.e., by inserting a lead, lead oxide, graphite or platinum anode and cathode into the cerous ion solution (the cerous ion must be in solution in a solvent such as mineral acid-water) and then passing a current through the solution. For example, the attached figure shows the electrolytic oxidation of solutions of cerous nitrate and cerous sulfate in aqueous nitric acid and sulfuric acid, respectively, to the corresponding ceric salts by electrolytic oxidation under conditions shown on the figure using a platinum gauze electrode. As noted on the figure, substantially complete conversion of the cerous to the ceric salts was achieved.

On the other hand, re-oxidation can occur during the condensation reaction by the electrolytic method above. In this manner, lesser amounts of the tetravalent cerium salt need be employed since the cerous ion is being regenerated to the ceric ion continuously during the reaction.

The invention will be further described with reference to the following experimental work.

*Example 1*

In the run for this example, 0.1 mole of ceric sulfate and 0.3 mole of toluene were added to a 300-milliliter resin pot fitted with a condenser, thermometer and stirrer. The contents were heated for eleven hours at 100° to 105° C., while maintaining a nitrogen atmosphere. The reaction products were cooled and the cerous salt removed by filtration. Chromatographic analysis indicated the predominant formation of dibenzyl (50 millimoles, hereinafter termed mm.) and trace amounts of benzaldehyde (less than 2 mm.). The calculated efficiency for forming the diaryl compound was 94 percent. By efficiency is meant the mm. of desired product, i.e. diaryl compound, which is actually formed, divided by the total mm. of desired product which theoretically should be formed, based on 100 percent conversion of the cerium salt.

*Example 2*

In this run, 0.5 mole of ceric sulfate and 2.0 moles of toluene were added to a 500-milliliter resin pot, fitted with a stirrer, condenser and thermometer. The contents were rapidly mixed for five hours at 110° C. No attempt was made to exclude air from the reaction mixture. The contents were cooled and the cerous salt was removed from the reaction mixture by filtration. Chromatographic analysis of the product indicated the formation of 225 mm. of dibenzyl and 50 mm. of benzaldehyde. The efficiency for forming the dibenzyl was calculated to be 82 percent.

A comparison of Examples 1 and 2 shows that the presence of a gas containing free molecular oxygen results in the formation of added amounts of the aldehyde. Examples 1 and 2 also show the excellent efficiency for the reaction of the desired diaryl compounds.

*Example 3*

Example 2 was repeated except 2.5 moles of para-xylene were used in place of the toluene. The reaction time was increased to six hours. Chromatographic analysis of the reaction product after filtration of the cerous salt indicated the formation of 195 mm. of p,p′-dimethyldibenzyl and 110 mm. of para-tolualdehyde. The efficiency for forming the dimer was calculated to be 64 percent.

A comparison of Examples 2 and 3 shows that both mono- and dialkylated aromatics can be employed in the subject reaction.

*Example 4*

In the run for this example, 1.16 moles of ceric oxide and 5.45 moles of toluene were added to a 1-liter resin pot fitted with a condenser, thermometer and stirrer. The contents were rapidly stirred and refluxed at 105° to 110° C. for eleven hours. Chromatographic analysis of the reaction mixture showed no product formation.

A comparison of Example 1 with Example 4 shows that not all ceric salts will work in the subject reaction, ceric oxide being an inactive form of ceric salt. It is believed ceric oxide is inactive since it is substantially insoluble in the reaction medium.

As noted above, it is desirous to avoid the use of organic acids as solvents for the subject reaction since the presence of organic acids promotes the formation of esters and thereby detracts from the efficiency of the process to the production of diaryl compounds. However, it has been discovered that ceric sulfate is unique in promoting the formation of diaryl compounds from the alkylated aromatic charge stocks defined above even in the presence of an organic acid solvent providing the reaction system is substantially anhydrous. The organic acid, preferably a monobasic acid, can suitably have between 2 and 10 carbon atoms and preferably between 2 and 4 carbon atoms. Suitable acids include acetic, propionic, butyric, octanoic, decanoic, etc.

This aspect of the invention is further described with reference to the following experimental work.

*Example 5*

In this run, 5.85 moles of glacial acetic acid, 0.9 mole of para-xylene, and 0.20 mole of ceric sulfate were added to a 500-milliliter resin pot fitted with a condenser, thermometer and stirrer. The contents were heated at 100° to 110° C. in an atmosphere of air for six hours with rapid mixing. The contents were cooled and cerous salt removed by filtration. Water was added to form two phases, an organic phase and a water-acetic acid phase. The organic phase was analyzed by gas chromatography and found to contain as products, 72 mm. of p,p′-dimethyldibenzyl and 60 mm. of para-tolualdehyde. Only trace amounts of para-methylbenzyl acetate were found. The efficiency for the formation of the dimer was calculated to be 55 percent.

*Example 6*

In the run for this example, 4.0 moles of propionic acid, 0.55 mole of ceric sulfate, 1.0 mole of toluene, and 1.11 moles of water were added to a 1-liter resin pot fitted with a stirrer, condenser and thermometer. The reactants were mixed rapidly and maintained at 110° C. for about four hours. The reaction mixture was cooled and the cerous salts were removed by filtration. Water was added to form two phases in order to separate the propionic acid solvent from the organic product phase. Analysis of the organic phase by gas chromatography indicated the formation of 32 mm. of dibenzyl, 42 mm. of benzylpropionate and 40 mm. of benzaldehyde.

A comparison of Examples 5 and 6 shows that when an anhydrous system is used (Example 5), no ester was formed, whereas, when water was employed (Example 6) more ester was formed than diaryl compound.

*Example 7*

In the run for this example, 5.83 moles of glacial acetic acid, 0.75 mole of toluene and 0.2 mole of ceric ammonium nitrate were added to a 1-liter flask fitted with a condenser, thermometer and stirrer. No water was added. The contents were rapidly mixed in the presence of air, while heating at a 100° to 110° C. temperature for 24 hours. The reaction mixture was cooled and water added to separate the organic product phase from the solvent phase. Analysis of the product by gas chromatography indicated the formation of 80 mm. of benzylacetate, 8 mm. of benzaldehyde and 12 mm. of dibenzyl.

Example 7 shows that ceric ammonium nitrate, when used in the presence of an organic acid as a solvent, promotes the formation of ester rather than the desired diaryl compounds, even in an anhydrous system.

As noted above, reacting an alkylaromatic which has at least two alpha-hydrogen atoms on the same carbon atom directly connected to the aromatic ring, in the absence of oxygen containing compounds selected from the group consisting of organic oxygen containing compounds and water, and in the conjoint presence of (1) a tetravalent anhydrous cerium salt selected from the group consisiting of ceric sulfate and ceric nitrate, and (2) selected inorganic nitrates selected from the group consisting of alkali metal, alkaline earth metal and ammonium nitrates, results in the production of oxygenated alkylaromatics, in addition to the condensation products, even in the absence of a gas which contains free molecular oxygen. This will be further illustrated by the examples given below.

*Example 8*

In this run, equimolar amounts of ceric sulfate and ammonium nitrate are admixed with toluene in a reaction flask in the absence of air and in the absence of water and extraneously added organic compounds containing oxygen. The reaction mixture is heated to between 90° and 100° C. for six hours. The product is a mixture of dimer and oxygenated materials.

*Example 9*

Example 8 is repeated except ceric nitrate is used in place of ceric sulfate. Similar results are obtained.

Resort may be had to such variations and modifications as fall within the spirit of the invention and the scope of the appended claims.

We claim:

1. A process for the condensation of an alkyl-monocyclic aromatic compound having between 7 and 18 carbon atoms, said alkyl-monocyclic aromatic compound having between 1 and 4 alkyl groups, at least one of said alkyl groups having at least one hydrogen atom attached to a carbon atom which is directly connected to an aromatic ring, and which carbon atom also forms a part of said alkyl group, said alkyl group having between 1 and 10 carbon atoms and having no olefinic unsaturation between the alpha and beta carbon atoms of said alkyl group, the remaining open positions on said alkyl-monocyclic aromatic having substituents selected from the group consisting of hydrogen, halogen, $NO_2$ and $-C\equiv N$ which comprises contacting at least one of said alkylaromatics in the substantial absence of a gas which contains free molecular oxygen and any oxygen-containing compounds selected from the group consisting of organic oxygen-containing compounds and water at a temperature between 60° C. and 300° C. with a promoter consisting of an anhydrous cerium salt wherein cerium has a valence of plus four and wherein said cerium salt has a water solubility at 25° C. of at least 0.05 gram per 100 grams of water.

2. A process according to claim 1 wherein the cerium salt is selected from the group consisting of ceric sulfate, ceric ammonium sulfate and ceric ammonium nitrate.

3. A process according to claim 1 wherein the cerium salt is ceric sulfate.

4. A process according to claim 1 wherein the cerium salt is ceric ammonium nitrate.

5. A process according to claim 1 wherein the alkylaromatic is selected from the group consisting of monoalkylaromatics represented by the formula:

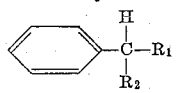

where $R_1$ and $R_2$ are selected from the group consisting of hydrogen, and hydrocarbon radicals having between one and 10 carbon atoms; and dialkylaromatics represented by the formula:

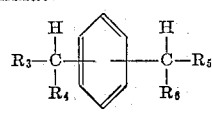

where $R_3$, $R_4$, $R_5$ and $R_6$ are selected from the group consisting of hydrogen and hydrocarbon radicals having between one and 10 carbon atoms.

6. A process according to claim 5 wherein the alkylaromatic is toluene.

7. A process according to claim 6 wherein the cerium salt is ceric sulfate.

8. A process for the condensation of an alkyl-monocyclic aromatic compound having between 7 and 18 carbon atoms, said alkyl-monocyclic aromatic compound having between 1 and 4 alkyl groups, at least one of said alkyl groups having at least one hydrogen atom attached to a carbon atom which is directly connected to an aromatic ring, and which carbon atom also forms a part of said alkyl group, said alkyl group having between 1 and 10 carbon atoms and having no olefinic unsaturation between the alpha and beta carbon atoms of said alkyl group, the remaining open positions on said alkyl-monocyclic aromatic having substituents selected from the group consisting of hydrogen, halogen, $NO_2$ and $-C\equiv N$ which comprises contacting at least one of said alkylaromatics in the substantial absence of any oxygen-containing compounds selected from the group consisting of organic oxygen-containing compounds and water at a temperature between 60° C. and 300° C. with a promoter consisting of an anhydrous cerium salt wherein cerium has a valence of plus four and wherein said cerium salt has a water solubility at 25° C. of at least 0.05 gram per 100 grams of water.

9. A process for the condensation and oxidation of an alkyl-monocyclic aromatic compound having between 7 and 18 carbon atoms, said alkyl-monocyclic aromatic compound having between 1 and 4 alkyl groups, at least one of said alkyl groups having at least two hydrogen atoms attached to a carbon atom which is directly connected to an aromatic ring and which carbon atom also forms a part of said alkyl group, said alkyl group having between 1 and 10 carbon atoms and having no olefinic unsaturation between the alpha and beta carbon atoms of said alkyl group, the remaining open positions on said alkyl-monocyclic aromatic having substituents selected from the group consisting of hydrogen, halogen, $NO_2$ and $C\equiv N$ which comprises contacting at least one of said alkylaromatics in the presence of a gas which contains free molecular oxygen and at a temperature between 60° C. and 300° C. with a promoter consisting of an anhydrous cerium salt wherein cerium has a valence of plus four and wherein said cerium salt has a water solubility at 25° C. of at least 0.05 gram per 100 grams of water, said contacting being in the substantial absence of oxygen-containing compounds selected from the group consisting of organic oxygen-containing compounds and water.

10. A process according to claim 9 wherein the cerium salt is selected from the group consisting of ceric sulfate, ceric ammonium sulfate and ceric ammonium nitrate.

11. A process according to claim 10 wherein the cerium salt is ceric sulfate.

12. A process for the condensation of an alkyl-monocyclic aromatic compound having between 7 and 18 carbon atoms, said alkyl-monocyclic aromatic compound having between 1 and 4 alkyl groups, at least one of said alkyl groups having at least one hydrogen atom attached to a carbon atom which is directly connected to an aromatic ring, and which carbon atom also forms a part of said alkyl group, said alkyl group having between 1 and 10 carbon atoms and having no olefinic unsaturation between the alpha and beta carbon atoms of said alkyl group, the remaining open positions on said alkyl-monocyclic aromatic having substituents selected from the group consisting of hydrogen, halogen, $NO_2$ and $-C\equiv N$ which comprises contacting at least one of said alkylaromatics in the substantial absence of a gas which contains free molecular oxygen at a temperature between 60° C. and 300° C. in a substantially anhydrous system with a promoter consisting of ceric sulfate.

13. A process for the condensation of an alkyl-monocyclic aromatic compound having between 7 and 18 carbon atoms, said alkyl-monocyclic aromatic compound having between 1 and 4 alkyl groups, at least one of said alkyl groups having at least one hydrogen atom attached to a carbon atom which is directly connected to an aromatic ring, and which carbon atom also forms a part of said alkyl group, said alkyl group having between 1 and 10 carbon atoms and having no olefinic unsaturation between the alpha and beta carbon atoms of said alkyl group, the remaining open positions on said alkyl-monocyclic aromatic having substituents selected from the group consisting of hydrogen, halogen, $NO_2$ and $—C≡N$ which comprises contacting at least one of said alkylaromatics at a temperature between 60° C. and 300° C. in a substantially anhydrous system and in the presence of a fatty acid having from 2 to 10 carbon atoms per molecule with a promoter consisting of ceric sulfate.

14. A process for the condensation and oxidation of an alkyl-monocyclic aromatic compound having between 7 and 18 carbon atoms, said alkyl-monocyclic aromatic compound having between 1 and 4 alkyl groups, at least one of said alkyl groups having at least two hydrogen atoms attached to a carbon atom which is directly connected to an aromatic ring and which carbon atom also forms a part of said alkyl group, said alkyl group having between 1 and 10 carbon atoms and having no olefinic unsaturation between the alpha and beta carbon atoms of said alkyl group, the remaining open positions on said alkyl-monocyclic aromatic having substituents selected from the group consisting of hydrogen, halogen, $NO_2$ and $C≡N$ which comprises contacting at least one of said alkylaromatics in the presence of a gas which contains free molecular oxygen at a temperature between 60° C. and 300° C. in a substantially anhydrous system with a promoter consisting of ceric sulfate in the presence of a fatty acid having 2–10 carbon atoms per molecule.

15. A process according to claim 14 wherein the alkylaromatic is p-xylene.

16. A process according to claim 15 wherein the organic acid is glacial acetic acid.

17. A process for the condensation and oxidation of an alkyl-monocyclic aromatic compound having between 7 and 18 carbon atoms, said alkyl-monocyclic aromatic compound having between 1 and 4 alkyl groups, at least one of said alkyl groups having at least two hydrogen atoms attached to a carbon atom which is directly connected to an aromatic ring and which carbon atom also forms a part of said alkyl group, said alkyl group having between 1 and 10 carbon atoms and having no olefinic unsaturation between the alpha and beta carbon atoms of said alkyl group, the remaining open positions on said alkyl-monocyclic aromatic having substituents selected from the group consisting of hydrogen, halogen, $NO_2$ and $C≡N$ which comprises contacting at least one of said alkylaromatics in the substantial absence of a gas containing free molecular oxygen and any oxygen-containing compounds selected from the group consisting of organic oxygen-containing compounds and water at a temperature between 60° C. and 300° C. with a promoter system consisting of a tetravalent anhydrous cerium salt selected from the group consisting of ceric sulfate and ceric nitrate and an inorganic nitrate selected from the group consisting of alkali metal, alkaline earth metal and ammonium nitrates.

18. A process according to claim 17 wherein the promoter system consists of ceric nitrate and ammonium nitrate.

19. A process according to claim 17 wherein said promoter system consists of ceric nitrate and ammonium nitrate.

References Cited

UNITED STATES PATENTS 3,047,616 7/1962 Blair et al. _____ 260—599

FOREIGN PATENTS 640,184 4/1962 Canada.

RICHARD K. JACKSON, *Primary Examiner.*

LORRAINE A. WEINBERGER, *Examiner.*

V. GARNER, *Assistant Examiner.*

UNITED STATES PATENT OFFICE
CERTIFICATE OF CORRECTION

Patent No. 3,349,117                      October 24, 1967

Charles M. Selwitz et al.

It is hereby certified that error appears in the above numbered patent requiring correction and that the said Letters Patent should read as corrected below.

Column 10, line 26, for "nitrate" read -- sulfate --.

Signed and sealed this 12th day of November 1968.

(SEAL)
Attest:

Edward M. Fletcher, Jr.                      EDWARD J. BRENNER
Attesting Officer                           Commissioner of Patents